(12) United States Patent
Chin

(10) Patent No.: US 10,443,299 B1
(45) Date of Patent: Oct. 15, 2019

(54) VACUUM INSULATED GLASS PANEL WITH STRUCTURED PILLAR UNIT

(71) Applicant: Kyun Jang Chin, Oak Brook, IL (US)

(72) Inventor: Kyun Jang Chin, Oak Brook, IL (US)

(*) Notice: Subject to any disclaimer, the term of this patent is extended or adjusted under 35 U.S.C. 154(b) by 0 days.

(21) Appl. No.: 16/510,820

(22) Filed: Jul. 12, 2019

Related U.S. Application Data

(62) Division of application No. 16/045,257, filed on Jul. 25, 2018.

(51) Int. Cl.
  *E06B 3/66* (2006.01)
  *E06B 3/663* (2006.01)

(52) U.S. Cl.
  CPC ........ *E06B 3/6612* (2013.01); *E06B 3/66304* (2013.01)

(58) Field of Classification Search
  CPC .......................... E06B 3/6612; E06B 3/66304
  See application file for complete search history.

(56) References Cited

U.S. PATENT DOCUMENTS

| 2014/0034218 A1* | 2/2014 | Hogan | E06B 3/6612 156/109 |
| 2016/0138324 A1* | 5/2016 | Lameris | E06B 3/6612 52/786.13 |
| 2018/0362400 A1* | 12/2018 | Streitsov | E06B 3/67334 |
| 2018/0363361 A1* | 12/2018 | Heckman | C09D 183/04 |

* cited by examiner

*Primary Examiner* — Patrick J Maestri
(74) *Attorney, Agent, or Firm* — Korus Patent, LLC; Seong Il Jeong

(57) ABSTRACT

A vacuum insulating glass panel is provided that includes two sheets of glass spaced apart by a predetermined distance, a structured pillar unit disposed between the two sheets of glass where the predetermined distance is a height of the structured pillar unit, and a wall interconnecting edges of the two sheets of glass, wherein space enclosed by the two sheets of glass and the wall is vacuumed to a predetermined pressure level. Vacuum compressive pressure from outer surface of two sheets of glass toward internal vacuum space provides semi-permanent life time. The structure pillar unit may be made of glass or engineering plastic, enabling mass production at affordable price with better quality compared to conventional products.

6 Claims, 5 Drawing Sheets

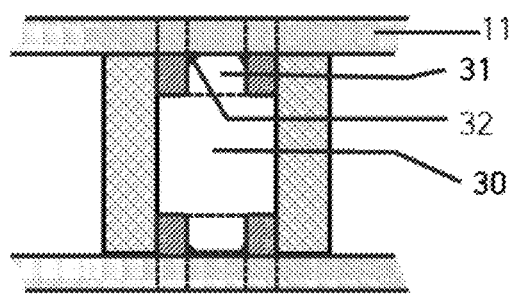
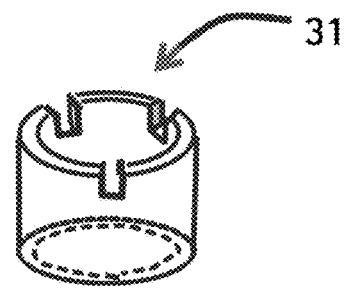
FIG. 3(a)  FIG. 3(b)
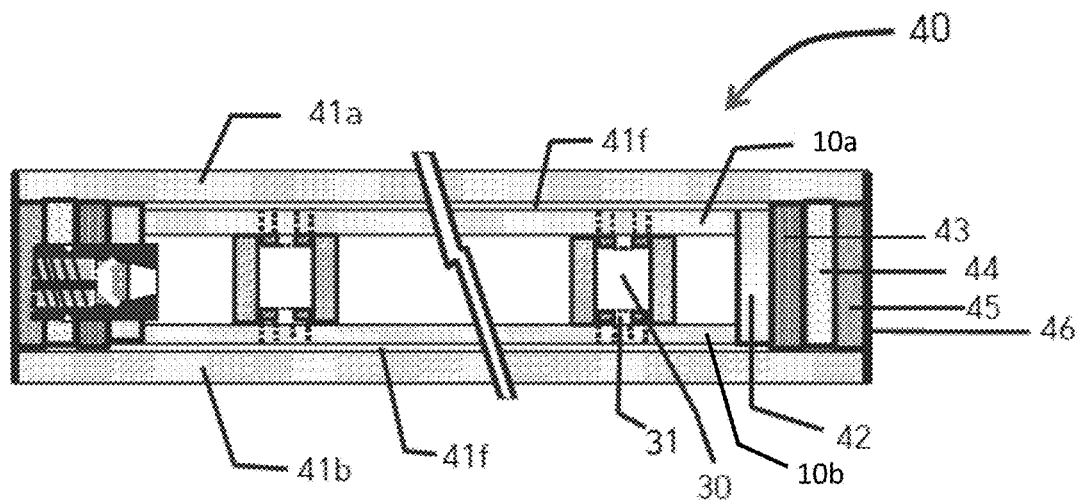
FIG. 4

VACUUM INSULATED GLASS PANEL WITH STRUCTURED PILLAR UNIT

BACKGROUND OF THE INVENTION

Field of the Invention

The present invention relates to a vacuum insulated glass panel, more particularly, to a vacuum insulated glass panel having a structured pillar unit.

Description of the Related Art

Vacuum insulated glass (VIG) panels have been known in the art. For example, see U.S. Pat. Nos. 5,664,395, 6,365,242 and 5,902,652; US Pat. Application Publication Nos. 20150079313 and 20100260950; and PCT Application Publication No. WO 2013/172033, the disclosures of which are all hereby incorporated herein by reference.

According to the conventional VIG panel, two spaced apart sheets of glass encloses an evacuated or low pressure space therebetween; extremely narrow vacuum space is used; huge number of small pillars are used; periphery glass sheets are enclosed by frit glass welding; vacuuming is processed in a heat chamber approximately at 500° C.; and it takes about 50 minutes to 1 hour to lower pressure to a desired level.

SUMMARY OF THE INVENTION

The present invention has been made in an effort to solve the above-described problems of the related art, and provides a vacuum insulated glass panel having a structured pillar unit. In the present invention, disadvantages of the conventional VIG such as huge number of small pillars, narrow vacuum space, pump-out tube, frit welding in periphery of glass edge, and vacuuming in high temperature chamber are displaced by a structured pillar unit as a single body, multilayer sealings, a vacuuming miniature piston valve, and a high wall providing large vacuum space. The structured pillar unit is disposed between two sheets of glass as a single body to replace huge number of pillars.

The structured pillar unit may be made of glass or engineering plastic, enabling mass production at affordable price with better quality compared to the conventional products. In addition, it takes a few minutes to lower pressure and vacuum compressive pressure from outer surface of two sheets of glass toward internal vacuum space provides semi-permanent life time.

According to one embodiment, there is provided a VIG panel including: two sheets of glass spaced apart by a predetermined distance; a structured pillar unit disposed between the two sheets of glass, the predetermined distance being a height of the structured pillar unit; and a wall interconnecting edges of the two sheets of glass, wherein space enclosed by the two sheets of glass and the wall is vacuumed to a predetermined pressure level.

The structured pillar unit may include two skeleton layers, each skeleton layer including a plurality of hexagon skeletons, vertices of the hexagon skeletons of a first skeleton layer being interconnected with corresponding vertices of the hexagon skeletons of a second skeleton layer by column pipes, respectively.

The vacuum insulating glass panel may further include a plurality of pipe holders for mounting the column pipes at vertices of the hexagon skeletons of the two skeleton layers. The two skeleton layers may be made from glass sheet or clear engineering plastic, enabling mass production at affordable price with better quality compared to conventional products.

The vacuum insulating glass panel may further include a vacuuming miniature piston valve, wherein the vacuuming miniature piston valve includes a cylinder, a piston with air passage inside, and a spring. The piston and inside of the cylinder may be configured to be narrowed toward one end thereof, respectively.

According to another embodiment, the structured pillar unit may include a sheet of glass with drilled holes wherein the diameter of the holes is equal to that of the column pipe. The column pipes are inserted into the holes and soldered by frit. The drilled holes may be located at every vertices and centers of the hexagon skeletons.

It is possible to use sealants by applying high compressive pressure onto outside surface of two sheets of glass toward vacuum space by high vacuum such as $10^{-1}$ Torr at least.

BRIEF DESCRIPTIONS OF THE DRAWINGS

The above and other objects, features and other advantages of the present invention will be more clearly understood from the following detailed description taken in conjunction with the accompanying drawings, in which:

FIG. 3(*a*) shows a cross sectional view illustrating a column pipe mounted to the two skeleton layers with a column pipe holder, and FIG. 3(*b*) shows a perspective view of the column pipe holder;

FIG. 4 is a cross sectional view of a vacuum insulated glass (VIG) panel using the first type of structured pillar unit as a single body;

DETAILED DESCRIPTION OF THE INVENTION

In the following detailed description of the present invention, references are made to the accompanying drawings that show, by way of illustration, specific embodiments in which the present invention may be implemented. These embodiments are described in sufficient detail to enable those skilled in the art to implement the present invention. It should be understood that various embodiments of the present invention, although different, are not necessarily mutually exclusive. For example, specific features, structures, and characteristics described herein, in connection with one embodiment, may be implemented within other embodiments without departing from the spirit and scope of the present invention. In addition, it should be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range equivalent to what the claims claim.

Hereinafter, a vacuum insulated glass panel having a structured pillar unit according to the present invention will be described with reference to the accompanying drawing.

Figure 1:
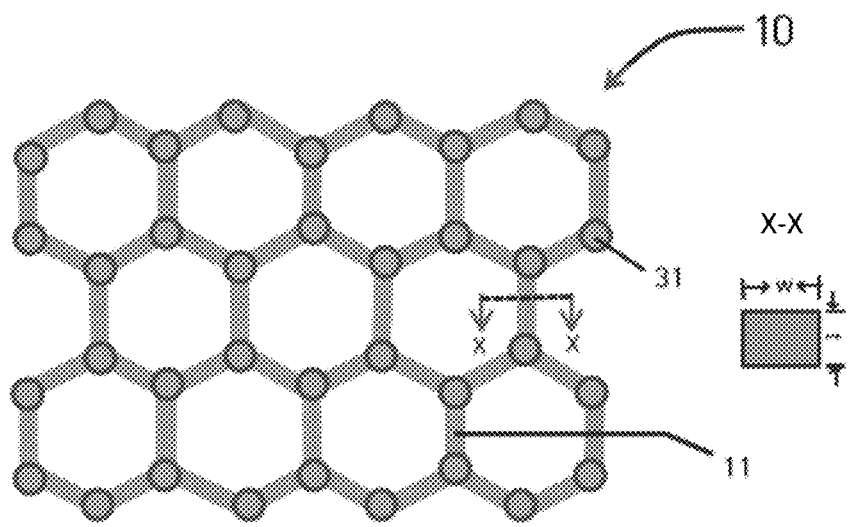
FIG. 1 shows a plan view of a skeleton layer having a plurality of hexagon skeletons.
Figure 2:
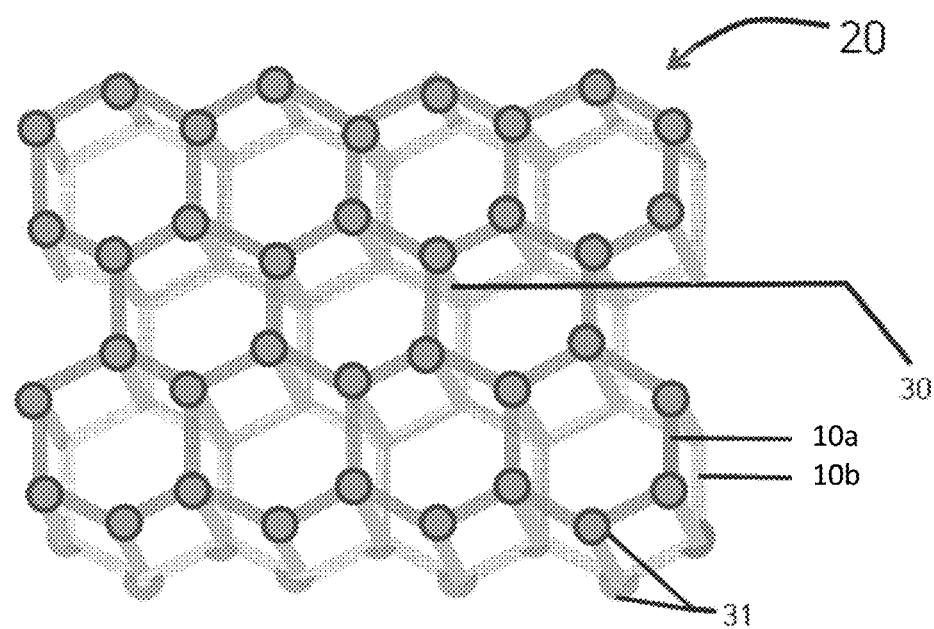
FIG. 2 shows a perspective view of a first type of structured pillar unit including two skeleton layers having a plurality of hexagon skeletons and combined with column pipes as a single body.

FIG. 1 shows a plan view of a skeleton layer 10 having a plurality of hexagon skeletons 11, and FIG. 2 shows a perspective view of a first type of a structured pillar unit 20.

Referring to FIG. 1, the thickness t of the skeleton layer 10 may be 3 to 5 mm, the width w thereof may be 4 to 6 mm, and the distance between vertices of the hexagon skeletons 11 may be 140 to 220 mm.

As illustrated in FIG. 2, the structured pillar unit 20 may include two skeleton layers 10a, 10b, wherein each skeleton layer 10a, 10b includes a plurality of hexagon skeletons 11. Vertices of the hexagon skeletons 11 of a first skeleton layer 10a are interconnected with corresponding vertices of the hexagon skeletons 11 of a second skeleton layer 10b, respectively, by column pipes 30 and column pipe holders 31, forming a single body.

The skeleton layer 10 may be made of glass pane or optionally an engineering plastic injected. The column pipe 30 may be made of hardened glass or clear engineering plastic injected. The diameter of column pipe 30 may be 14 to 24 mm; thickness thereof may be 2 to 4 mm; the height thereof may be 8 to 12 mm; the distance between column pipes 30 may be 140 to 220 mm; and mechanical compressive strength thereof may be approximately 1,000 MPa.

FIG. 3(a) shows a cross sectional view illustrating a column pipe 30 mounted to hexagon skeletons 11 of the two skeleton layers 10a, 10b with column pipe holders 31. FIG. 3(b) shows a perspective view of the column pipe holder 31. A plurality of column pipe holders 31 are configured to mount the column pipes 30 at vertices of the hexagon skeletons of the two skeleton layers 10a, 10b. To mount a column pipe 30, a column pipe holder 31 may be disposed on every vertex of the hexagon skeletons 11 by welding 32 or just fit in. The two skeleton layers 10a, 10b may be made from glass sheet or clear engineering plastic, enabling mass production at affordable price with better quality compared to conventional products.

FIG. 4 is a cross sectional view of a vacuum insulated glass (VIG) panel 40 using the first type of structured pillar unit 20 as a single body. According to one embodiment, there is provided a VIG panel 40 including: two sheets of glass 41a, 41b spaced apart by a predetermined distance; a structured pillar unit 20 disposed between the two sheets of glass 41a, 41b, the predetermined distance being a height of the structured pillar unit 20; and a wall 42 interconnecting edges of the two sheets of glass 41a, 41b, wherein space enclosed by the two sheets of glass 41a, 41b and the wall 42 is vacuumed to a predetermined pressure level.

Figure 5:
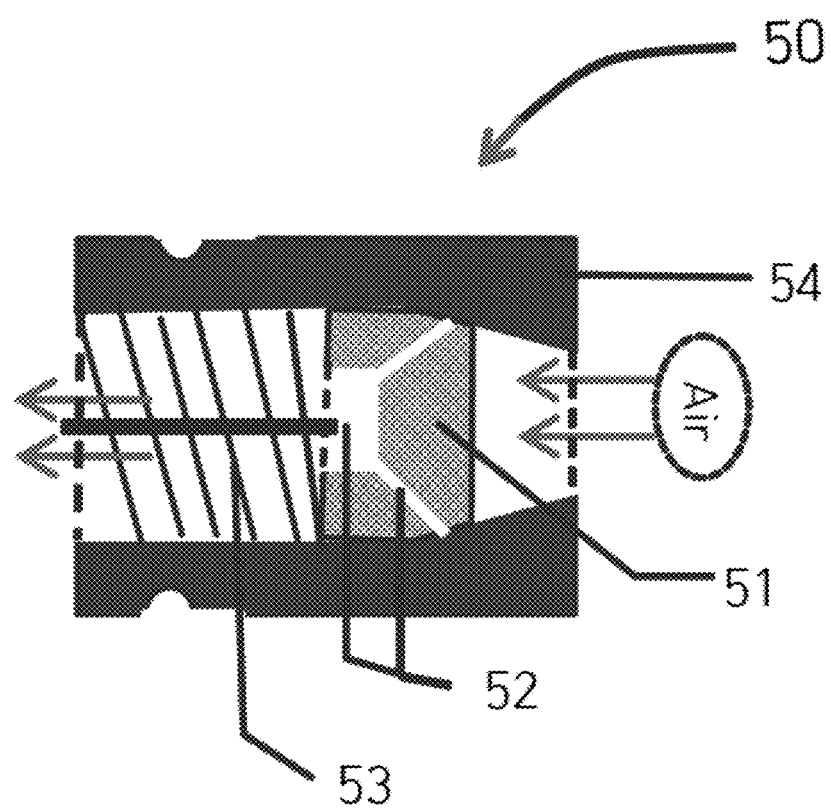
FIG. 5 shows a vacuuming miniature piston valve for connecting a vacuuming hose.

The vacuum insulating glass panel 40 may further include a vacuuming miniature piston valve 50. FIG. 5 shows a vacuuming miniature piston valve 50 for connecting a vacuuming hose. The vacuuming miniature piston valve 50 may include a cylinder 54, a piston 51 with air passage 52 inside, and a spring 53. The piston 51 and inside of the cylinder 54 may be configured to be narrowed toward one end thereof, respectively. The vacuuming miniature piston valve 50 may be inserted between two sheets of glass 41a, 41b through wall 42 and to be connected vacuuming hose to lower pressure in the vacuum space. The diameter of the vacuuming miniature piston valve may be 7 to 9 mm. The piston 51 and inside of the cylinder 54 may be configured to be narrowed toward one end thereof, respectively, to close and open by the piston moving up and down. The piston 51 may be pushed up when vacuum pump hose is connected by its suction power. After vacuuming, the piston 51 may be pushed down by the spring 53 and vacuum pressure immediately. And then sealant will be deposited in vacuuming miniature piston valve 50 and buried in multilayer sealants 43, 44, 45 and a lacquer cloth 46.

According to an embodiment of the present invention, the vacuuming miniature piston valve 50 may be inserted through the wall 42 at the center of either side of glass sheets preferably in the longer side before the wall 42 is placed between the sheets of glass 41a, 41b.

Figure 6:
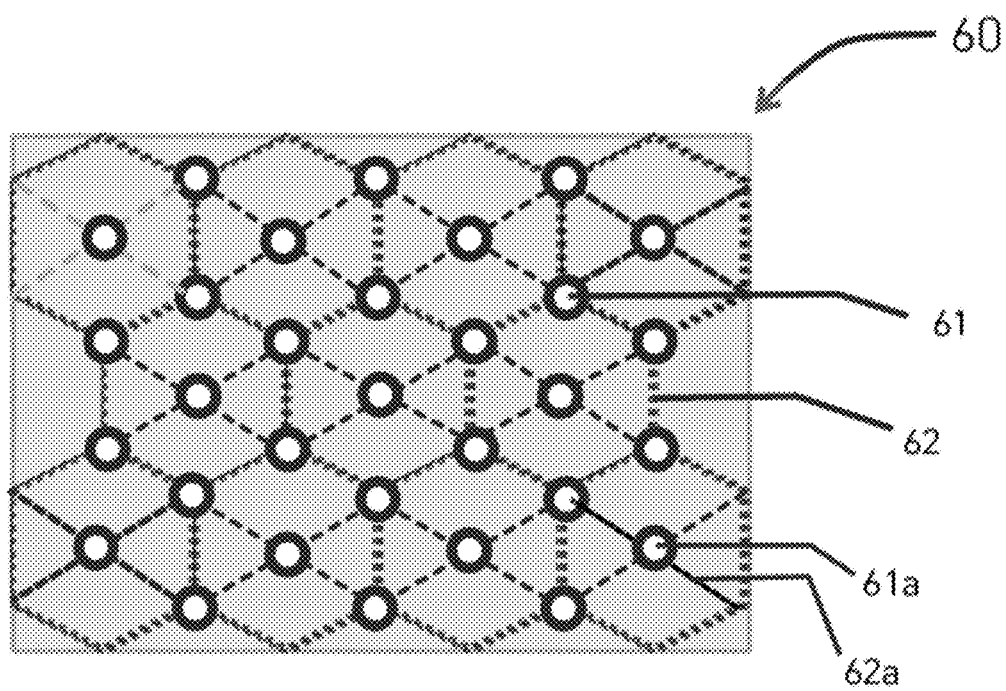
FIG. 6 shows a plan view of a sheet of glass with drilled holes at vertices and centers of virtual hexagons into which the column pipes are inserted.

According to another embodiment, as illustrated in FIG. 6, a structured pillar unit may be configured to include a sheet of glass 60 with drilled holes 61, diameter of the holes 61 being that of the column pipe 30, and the column pipes 30 are inserted into the holes 61 and soldered by frit. FIG. 6 shows a plan view of a sheet of glass 60 with the drilled holes 61 at vertices and centers 61a of virtual hexagons 62 on the sheet of glass 60 into which the column pipes 30 are inserted. The drilled holes 61 may be located at every vertices and centers 61a of the virtual hexagons 62 on the sheet of glass 60. Virtual lines 62a are displayed to show the vertices and centers 61a of the virtual hexagons 62 on the sheet of glass 60. This is a mathematical solution to positioning column pipes 30 which provides equilibrium positions for vacuum compressive stress, minimizing number of column pipes 30 with the least deviations of tensile stress on the glass surface 41a, 41b.

Figure 7:
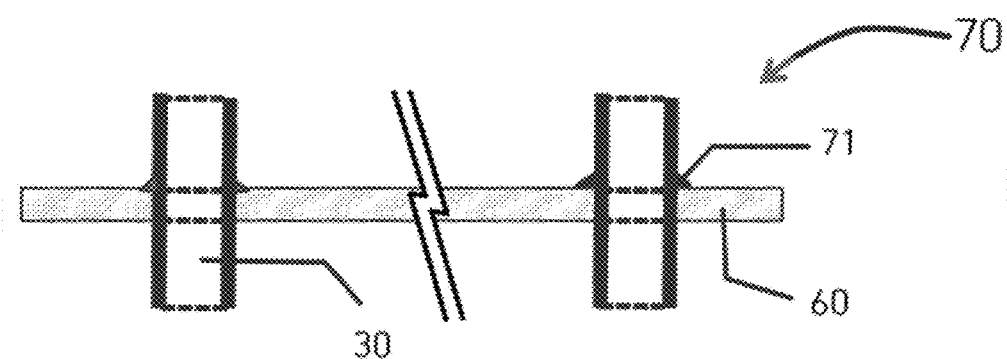
FIG. 7 shows a second type of structured pillar unit wherein column pipes are inserted into holes of the sheet of glass of FIG. 6, forming the second type of structured pillar unit as a single body.

FIG. 7 shows a second type of structured pillar unit 70 wherein column pipes 30 are inserted into the holes 61 of the sheet of glass 60 of FIG. 6, forming the second type of structured pillar unit as a single body. The distance between the column pipes 30 in the second type of structured pillar unit may be 120 to 180 mm. Mechanical compressive strength of the second type of structured pillar unit may be 1,000 MPa or more.

Figure 8:
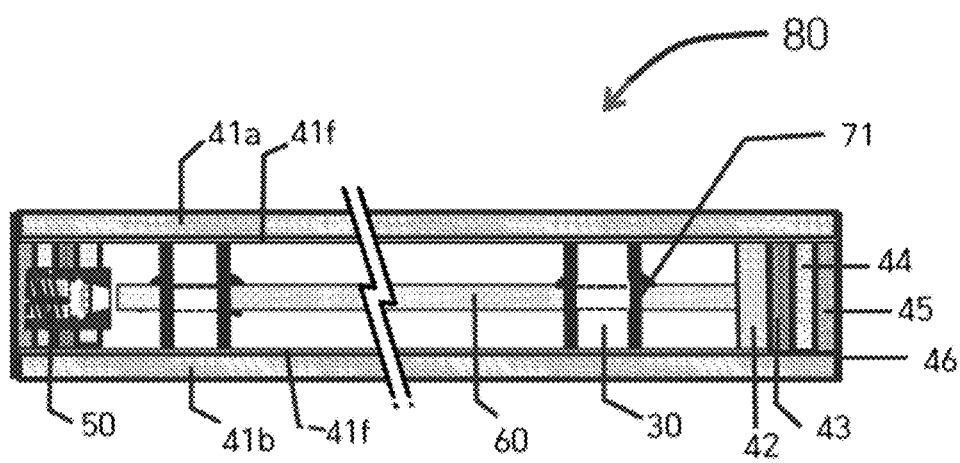
FIG. 8 shows a cross sectional view of a VIG panel using the second type of structured pillar unit.

FIG. 8 shows a cross sectional view of a vacuum insulated glass (VIG) panel 80 using the second type of structured pillar unit 70. The second type of structured pillar unit 70 includes a sheet of glass with drilled holes. The column pipes 30 are inserted into the holes and soldered 71 by frit.

Referring to FIGS. 4 and 8, the two sheets of glass 41a, 41b and the wall 42 enclose the vacuum space and hermetically sealed by multilayer sealants 43, 44, 45 and a lacquer cloth 46. The multilayer sealants 43, 44, 45 tightly hold the two sheets of glass 41a, 41b by compressive pressure of vacuum.

According to an embodiment of the present invention, the wall 42 between the two sheets of glass 41a, 41b may be sealed by butyl-based sealant 43; vacuum silica contained silicon sealant 44; polysulfide-based sealant 45; and closed by natural lacquer cloth 46.

One or two among multilayer sealants 43, 44, 45 may be omitted but not vacuum silica contained silicon sealant 44. The lacquer cloth 46 may be replaced by adhesive Low-E film.

Embodiments of the present invention disclosed above are optimum solutions based on 5 mm thick glass with low-E film 41f. Thus, if the glass thickness is different, the parts and dimensions can be easily adjusted. And low-E tempered glass is absolute necessary conditions. Side of the low E film 41f is faced towered inside vacuum space to absorb shock between the structured pillar unit and the two sheets of glass 41a, 41b.

It is possible to use sealants by applying high compressive pressure onto outside surface of two sheets of glass toward vacuum space by high vacuum such as $10^{-1}$ Torr at least.

Particularly, a VIG panel using a structured pillar unit 20, 70 as a single body disposed between two sheets of glass 41a, 41b enclosing vacuum space between them by wall 42 with multilayer different kinds of sealants 43, 44, 45 or frit welding optionally. A low-E hardened glass panel of 5 mm thick is used as the wall 42 and the two sheets of glass 41a, 41b.

Figure 9:
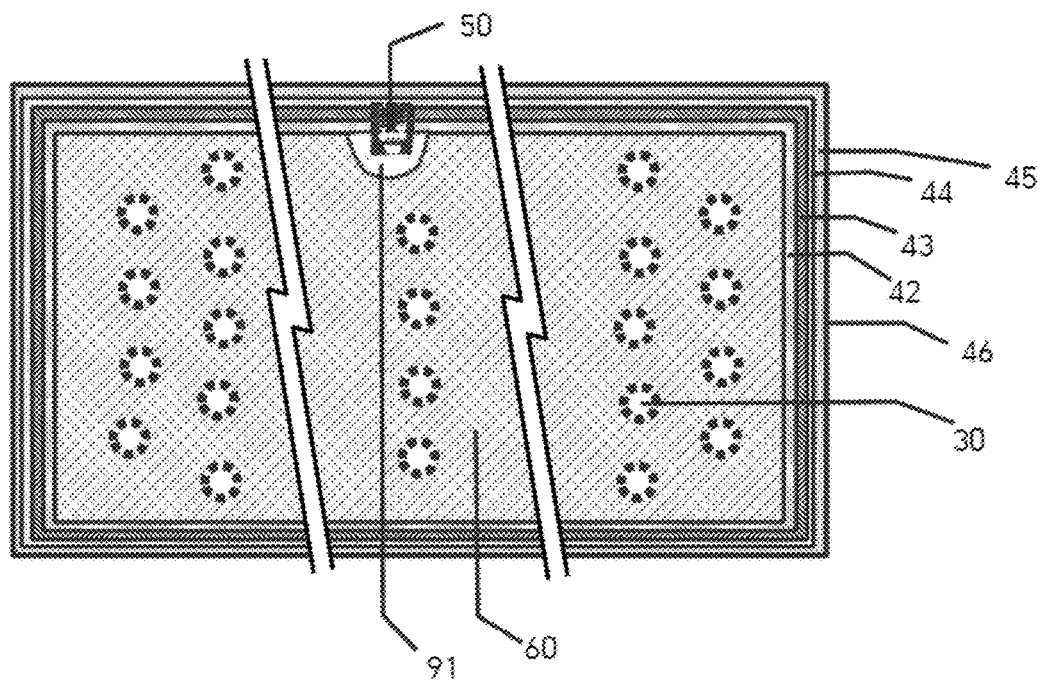
FIG. 9 shows a cross sectional view of a VIG panel using the second type of structured pillar unit and illustrates cut-out space for providing a room for a vacuuming miniature piston valve.

FIG. 9 shows a cross sectional view of a VIG panel using the second type of structured pillar unit and illustrates cut-out space 91 for providing a room for a vacuuming miniature piston valve 50.

In the foregoing descriptions, although the present invention has been described in connection with the specific matters, such as the specific components, the specific embodiments, and the drawings, they are provided only for assisting in the understanding of the present invention, and the present invention is not limited to the embodiments. It will be apparent that those skilled in the art can make various modifications and changes thereto from these descriptions.

Therefore, the spirit of the present invention should not be limited to the aforementioned embodiments, and the appended claims and what are modified equally or equivalently thereto will be considered to fall within the scopes of the present invention.

What is claimed is:

1. A vacuum insulating glass panel comprising:
   first and second sheets of glass spaced apart by a predetermined distance;
   a structured pillar unit disposed between the first and second sheets of glass, the predetermined distance being a height of the structured pillar unit; and
   a wall interconnecting edges of the first and second sheets of glass,
   wherein space enclosed by the first and second sheets of glass and the wall is vacuumed to a predetermined pressure level,
   wherein the structured pillar unit comprises a third sheet of glass with a plurality of holes, and a plurality of column pipes are inserted into the holes and soldered by frit, respectively, a diameter of the holes being configured such that the column pipes are slidably inserted into the holes.

2. The vacuum insulating glass panel of claim 1, wherein the holes are located at every vertices and centers of virtual hexagons on the third sheet of glass.

3. The vacuum insulating glass panel of claim 1, wherein a distance between the column pipes is 120 to 180 mm.

4. The vacuum insulating glass panel of claim 1, further comprising a vacuuming miniature piston valve, wherein the vacuuming miniature piston valve comprises a cylinder, a piston with air passage inside, and a spring.

5. The vacuum insulating glass panel of claim 4, wherein the piston and inside of the cylinder are configured to be narrowed toward one end thereof, respectively.

6. The vacuum insulating glass panel of claim 4, wherein a diameter of the vacuuming miniature piston valve is 7 to 9 mm.

* * * * *